(12) United States Patent
Habte

(10) Patent No.: US 11,007,844 B1
(45) Date of Patent: May 18, 2021

(54) MULTI-CHANNEL AIR VENT ASSEMBLY WITH NARROW PROFILE

(71) Applicant: JoysonQuin Automotive Systems North America, LLC, Troy, MI (US)

(72) Inventor: Melaku Habte, Rochester Hills, MI (US)

(73) Assignee: JOYSONQUIN AUTOMOTIVE SYSTEMS NORTH AMERICA, LLC, Troy, MI (US)

( * ) Notice: Subject to any disclaimer, the term of this patent is extended or adjusted under 35 U.S.C. 154(b) by 0 days.

(21) Appl. No.: 16/902,620

(22) Filed: Jun. 16, 2020

Related U.S. Application Data (60) Provisional application No. 62/935,128, filed on Nov. 14, 2019.

(51) Int. Cl.
*B60H 1/34* (2006.01)
*B60H 1/00* (2006.01)

(52) U.S. Cl.
CPC ....... *B60H 1/0055* (2013.01); *B60H 1/00564* (2013.01); *B60H 1/3414* (2013.01)

(58) Field of Classification Search
CPC .............. B60H 1/0055; B60H 1/00564; B60H 2001/006; B60H 1/34; B60H 1/3414; B60H 1/3421
USPC .................................................. 454/69–165
See application file for complete search history.

(56) References Cited

U.S. PATENT DOCUMENTS

| | | | |
|---|---|---|---|
| 2004/0152411 A1 | 8/2004 | Gehring et al. | |
| 2012/0009861 A1 | 1/2012 | Mercey et al. | |
| 2015/0328958 A1* | 11/2015 | Winget, Jr. | B60H 1/3414 454/155 |
| 2018/0056756 A1* | 3/2018 | Schaal | B60H 1/3414 |
| 2018/0334015 A1* | 11/2018 | Doll | B60H 1/345 |
| 2019/0168583 A1* | 6/2019 | Dinant | B60H 1/3414 |
| 2019/0359034 A1* | 11/2019 | Dinant | B60H 1/3428 |

FOREIGN PATENT DOCUMENTS

| | | |
|---|---|---|
| CN | 109823143 A | 5/2019 |
| KR | 20180127920 A | 11/2018 |

* cited by examiner

*Primary Examiner* — Vivek K Shirsat
*Assistant Examiner* — Ko-Wei Lin
(74) *Attorney, Agent, or Firm* — Fox Rothschild LLP

(57) ABSTRACT

An air vent assembly includes an air inlet, an air outlet, and two or more channels that are positioned between the air inlet and the air outlet. The air vent assembly also includes moveable vanes that are interconnected to an actuator that is configured to move each of the moveable vanes in unison. The vanes may be positioned in the channels or upstream of the channels. The air vent assembly also includes a valve that is positioned between the air inlet and the vanes, and which is configured to selectively increase or decrease air flow to at least one of the channels when moved. Optionally, the vanes may be positioned at least partially behind a fixed divider so that they are not typically visible via the air outlet.

18 Claims, 9 Drawing Sheets

MULTI-CHANNEL AIR VENT ASSEMBLY WITH NARROW PROFILE

RELATED APPLICATIONS AND CLAIM OF PRIORITY

This patent document claims priority to U.S. Provisional Patent Application No. 62/935,128, filed Nov. 14, 2019. The disclosure of the priority application is fully incorporated into this document by reference.

BACKGROUND

Vehicle instrument panels (such as dashboards) are including larger and more electronic screens (such as multi-information displays and touch-screens) with sensor readouts and equipment control inputs. For example, in a truck, van or automobile, sensor readouts may include a speedometer, tachometer, odometer, engine temperature, oil level, warning lights and the like. Example equipment controls may be for vehicle climate, radio, windshield wipers, engine gear selection, interior and exterior lights, and the like. Other types of vehicles, such as boats, airplanes and the like, also are increasingly using larger and more electronic screens in the instrument panel.

To assist with climate control inside of a vehicle, air vents may be positioned at various locations on the instrument panel to accommodate the vehicle driver and other passengers in the vehicle. The surface area of each air vent is in direct competition with the desire for larger electronic screens on the instrument panel. Thus, there is a desire to provide an air vent with a slim design. There is also a desire to provide air vents in a vehicle instrument panel with no manual controls. Automobiles with autonomous driving capabilities would require air vents to be positioned at various locations within the vehicle cabin instead of the traditional locations such as the vehicle instrument panel. The slim air vent design may provide the flexibility to be installed at various locations within the vehicle cabin.

This document describes a novel solution that addresses at least some of the issues described above.

SUMMARY

In various embodiments, an air vent assembly includes an air inlet, an air outlet, and two or more channels that are positioned between the air inlet and the air outlet. The air vent assembly also includes moveable vanes that are interconnected to an actuator that is configured to move each of the moveable vanes in unison. The air vent assembly also includes a valve that is positioned between the air inlet and the vanes, and which is configured to selectively increase or decrease air flow to at least one of the channels when moved.

Optionally, the valve may be configured to be rotated about a pivot point that is positioned between two of the channels so that: (a) rotating the valve in a first direction past a midway point will decrease size of an intake area leading to the first channel; and (b) rotating the valve in a second direction past the midway point will decrease size of an intake area leading to the second channel. The first and second directions comprise opposite directions.

Optionally, the valve may be configured to be rotated about a pivot point that is positioned within a conduit leading from the air inlet to the moveable vanes. If so, then rotating the valve in a first direction past a midway point will cause relatively more air from the air inlet to be directed to a first set of the moveable vanes associated with a first one of the channels and relatively less air from the air inlet to be directed to a second set of the movable vanes associated with a second one of the channels, In addition, rotating the valve in a second direction past the midway point will cause relatively less air from the air inlet to be directed to the first set of the moveable vanes and relatively more air from the air inlet to be directed to the second set of the movable vanes. The first and second directions comprise opposite directions.

In some embodiments, the air vent assembly includes a divider that is positioned to block the moveable vanes from being visible via the air outlet. In some embodiments, the divider may be fixed. For example, the divider may include a barrier that is positioned in front of at least a portion of the moveable vanes. In addition or alternatively, the divider may include a space that physically separates a first set of the moveable vanes and a second set of the moveable vanes, or that separates the two channels.

In some embodiments, the actuator may be interconnected to the moveable vanes so that the actuator is configured to move each of the moveable vanes in unison.

In some embodiments, the moveable vanes may comprise a first group of vanes that are positioned in first one of the channels and a second group of vanes positioned in a second one of the channels. In other embodiments, the moveable vanes may be positioned upstream of each of the plurality of channels. In some embodiments, a first group of vanes may be at least partially positioned in a conduit that leads from the air inlet and may lead to a first channel of the plurality of channels, and a second group of vanes may be at least partially positioned in the conduit and may lead to a second channel of the plurality of channels The air vent assembly also may include a first motor for operating the actuator, along with a second motor for operating the valve.

Optionally, the channels may comprise two channels, a first of which may be positioned to direct air toward the air outlet at a first angle with respect to a flow vector of the air inlet, and a second of which may be positioned to direct air toward the air outlet at a second angle with respect to the flow vector of the air inlet. In this embodiment, the first angle and the second angle may be adjacent and substantially equal angles.

In some embodiments, the valve is configured so that, during operation of the air vent assembly, moving the valve in a first direction will decrease air flow to a first one of the channels, and moving the valve in a second direction (opposite the first direction) will decrease air flow to a second one of the channels.

DETAILED DESCRIPTION

Terminology that is relevant to this disclosure is provided at the end of this detailed description. The illustrations are not to scale. The air vent assembly may be oriented vertically or horizontally or at an angle when installed in a vehicle or other structure. A vertically oriented vent may be positioned beside an electronic screen or between two electronic screens forming a streamlined appearance, such as between the sensor readouts electronic screen for the driver, the center console electronic screen, and the passenger's electronic screen. Vertical air vents may also be positioned near the vehicle's doors for defrosting side windows. A horizontal air vent could be positioned above or below one or more electronic screens, forming a streamlined appearance, such as in an extended center console of the instrument panel or along the top and bottom edges of the instrument panel. Horizontal air vents may also be positioned proximate the windshield for defrosting the windshield. In autonomous vehicle applications where passengers may not be required to be positioned as traditionally facing the windshield and instead sitting in a group or facing towards the side or the rear of the vehicle, the air vents can optionally be positioned to be anywhere on the floor of the cabin or the ceiling of the cabin.

Figure 1:
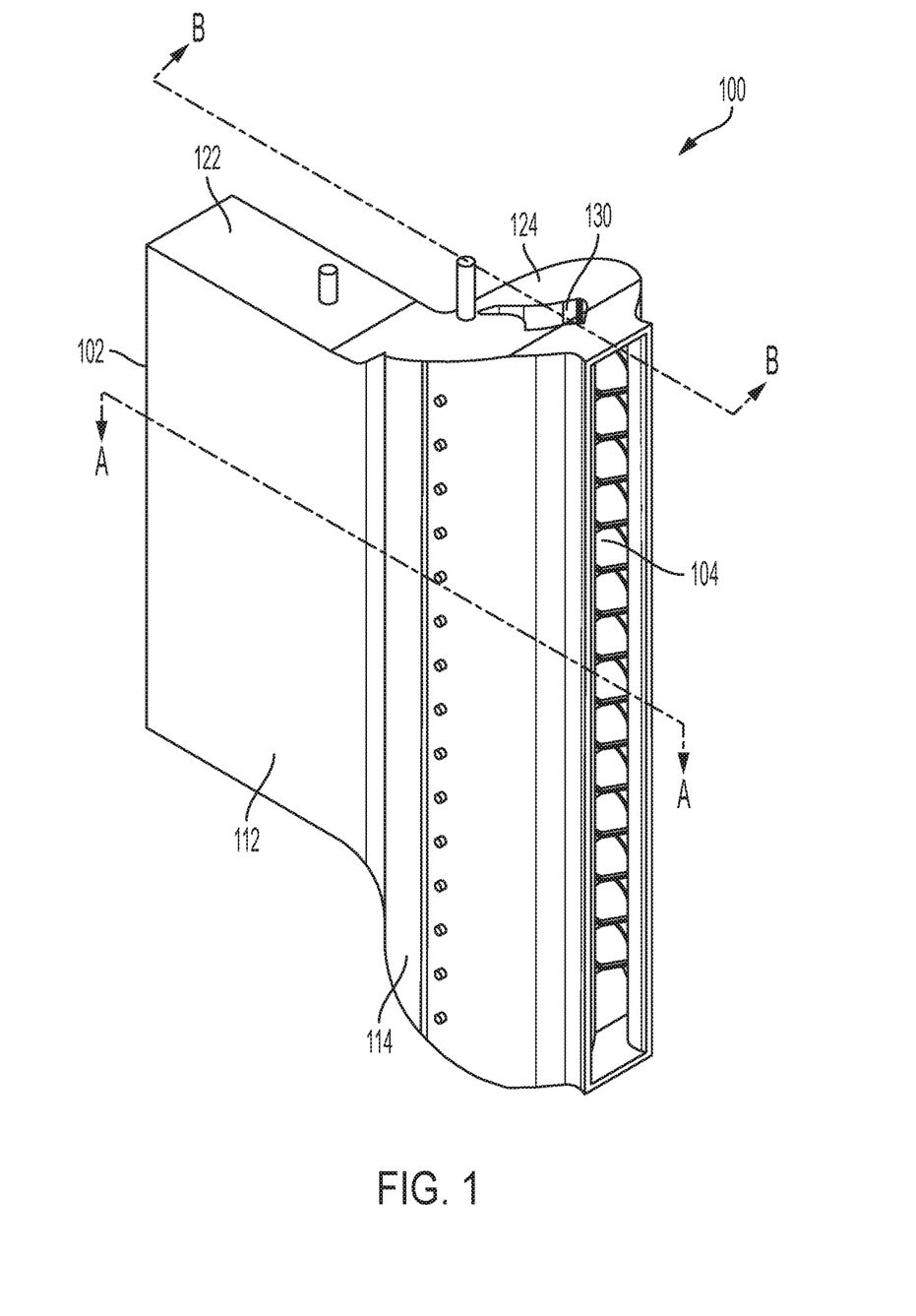
FIG. 1 is an isometric view of an air vent assembly.
Figure 2:
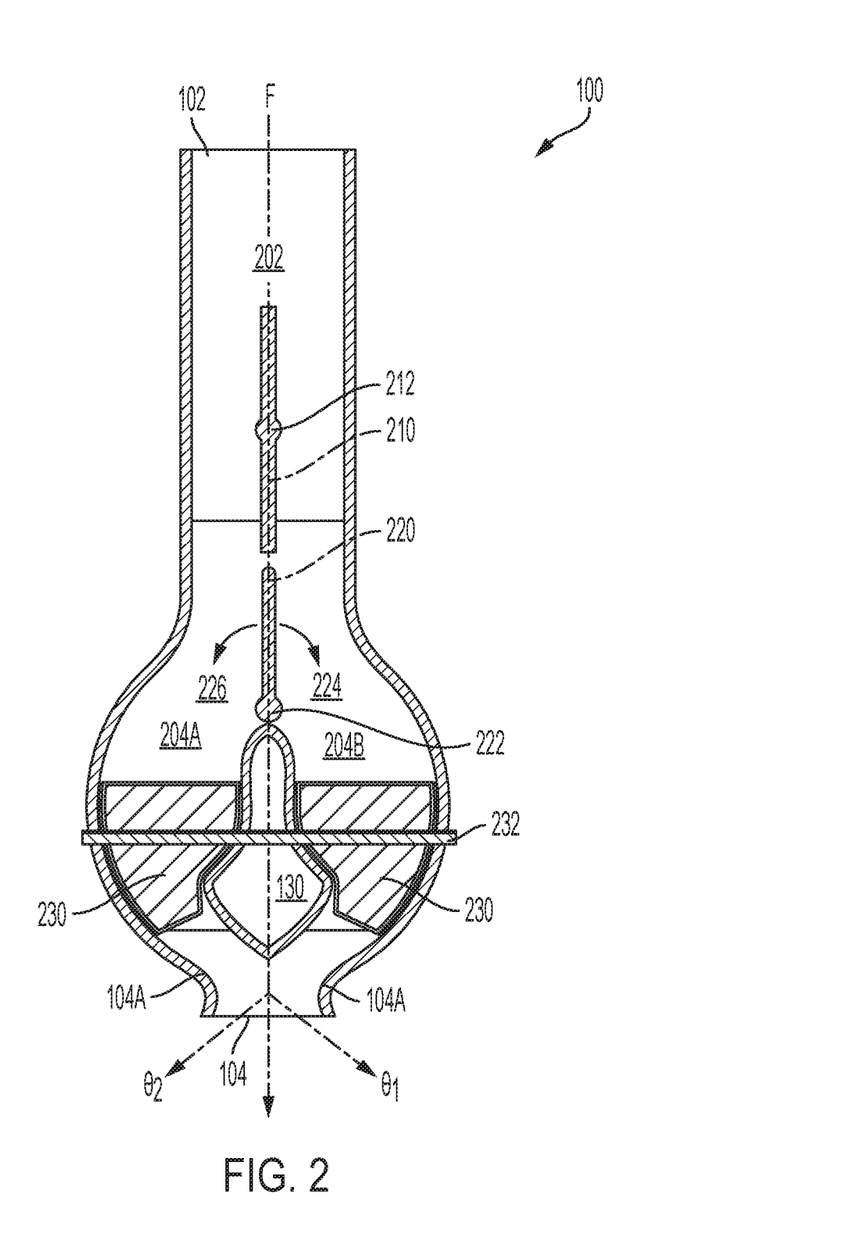
FIG. 2 is a side sectional view of the air vent assembly of FIG. 1 along cutline A-A.
Figure 3:
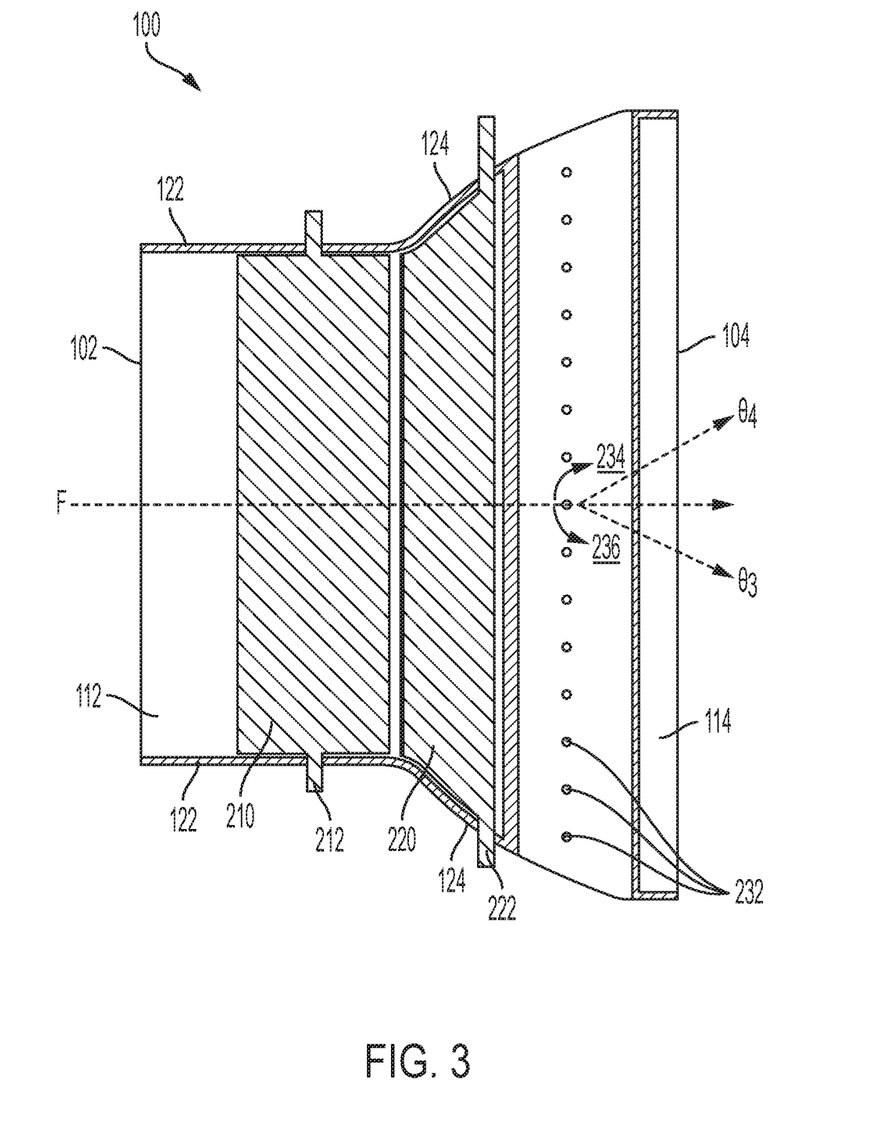
FIG. 3 is a top sectional view of the air vent assembly of FIG. 1 along cutline B-B.
Figure 4:
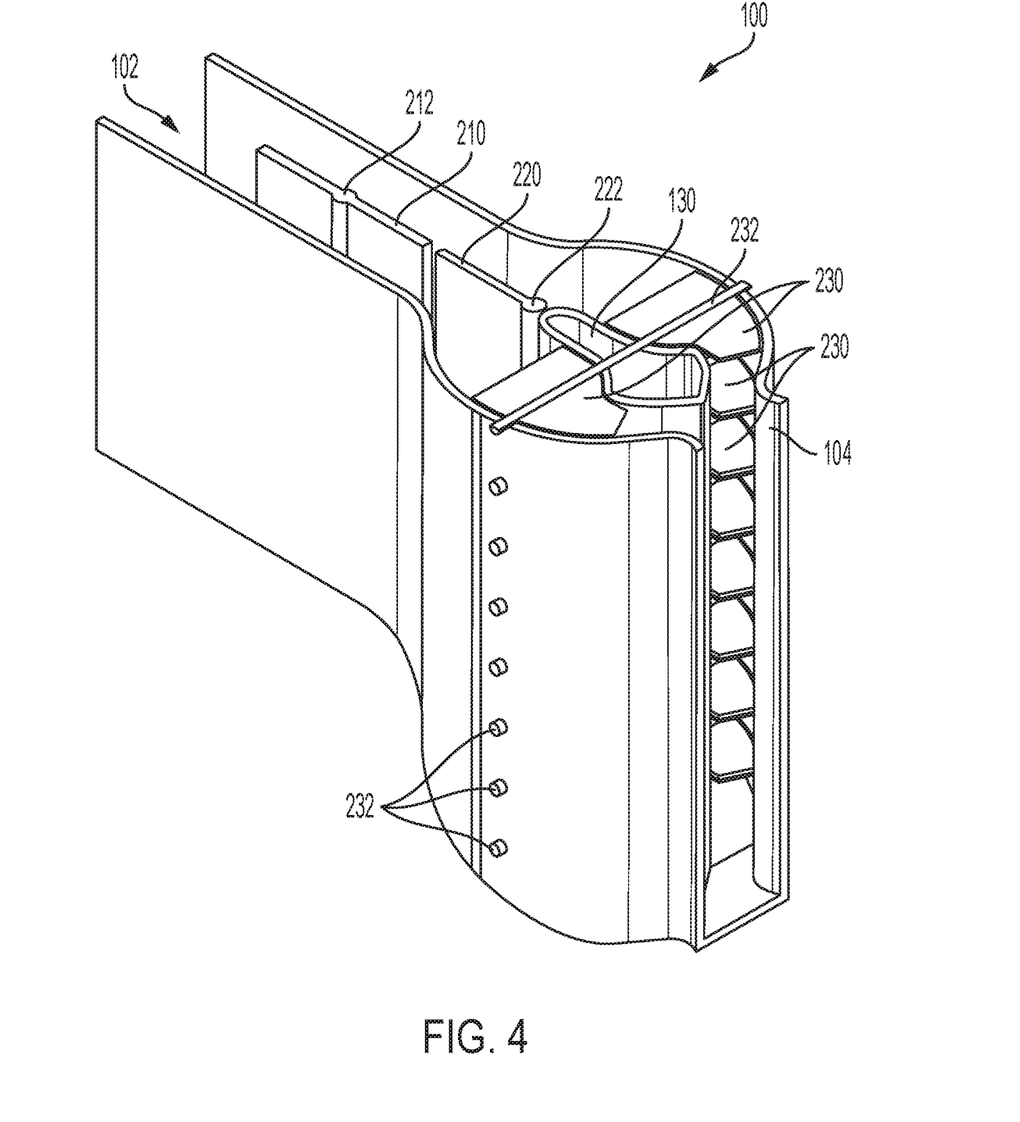
FIG. 4 is partial view of the air vent assembly of FIG. 1.

FIG. 1 is an isometric view of an air vent assembly 100. FIG. 2 is a sectional view of the air vent assembly 100 of FIG. 1 along cutline A-A, FIG. 3 is a sectional view of the air vent assembly 100 of FIG. 1 along cutline B-B, while FIG. 4 is a partial view of the air vent assembly 100 of FIG. 1. The air vent assembly 100 may include a housing that includes an air inlet 102, an air outlet 104, and a conduit 202 leading to two or more channels 204A, 204B positioned between the air inlet 102 and the air outlet 104. Each channel 204A, 204B is proximate to the air outlet 104. Heated, cooled or vented air such as from a vehicle heating, ventilation and air conditioning (HVAC) module (not shown) is forced through the air vent assembly 100 by a fan, such as may exist in a heater or air conditioning unit (not shown). Air flow enters the air inlet 102, is divided into each open channel 204A, 204B, and recombines at the air outlet 104 to direct the conditioned air into the passenger compartment of the vehicle.

The air vent assembly 100 may have outer walls to form the housing that holds the conduit 202 and channels 204A, 204B. For example, a first section of the air vent assembly 100 may have planar walls 112, 122 and a second section may have curved or angled walls 114, 124. For example, a first planar wall 112 combines with a first curved wall 114 to form a first curvilinear outer wall. A second planar wall 122 may combine with a second curved wall 124 to form a second curvilinear outer wall. An interior divider 130 may be positioned in the second section of the air vent assembly 100 between the curved walls 114, 114 to form the vent areas. The divider may be a physical barrier, or simply a space that separates the vent areas. The curved walls may have other shapes, such as being angled or ribbed, so that they form a vent section that includes the channels 204A, 204B and leads to an air outlet 104 that is wider than the air inlet 102. This planar/curved combination forming a curvilinear structure is optional, and other designs may be used.

Figure 5:
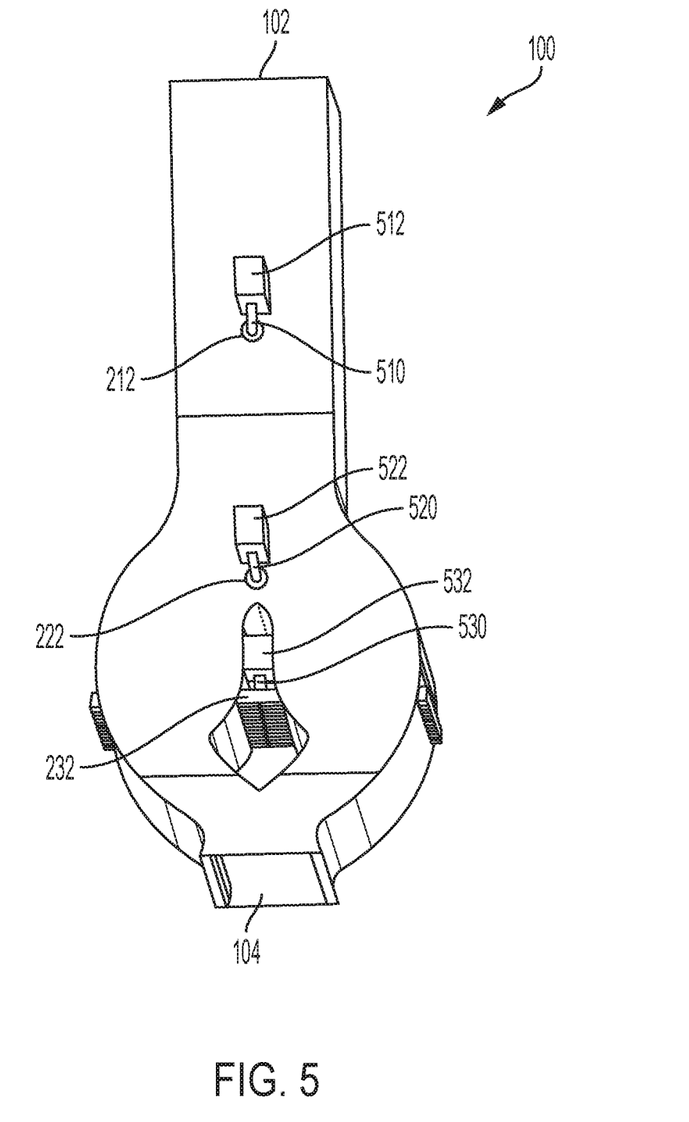
FIG. 5 is a bottom view of the air vent assembly of FIG. 1 with motor actuators.

Optionally, an interior divider wall within the conduit 202 may have a pivot point 212 (such as a hinge or axle) to enable it to function as a flow volume control valve 210. The flow regulating valve 210 may be configured to regulate the volume of air flow and/or completely close off the flow of air to a downstream area of the conduit and all channels 204A, 204B and serve as a shut-off door. For example, when the flow regulating valve 210 is at a midway point, the air flow is divided substantially equal to two channels 204A and 204B. When the flow regulating valve 210 is rotated to a closing position, the air flow to both channels 204A and 204B will be blocked. At intermediate positions between the midway point and the fully-closed position, the flow regulating valve 210 may block part of the flow surface area within the conduit 202, thus reducing the volume of air that may flow to the channels 204A and 204B at any particular air flow rate. The central pivot point 212 of the flow regulating valve 210 may be interconnected to a first actuator 510 that is configured to move the flow regulating valve 210 from the midway (fully-open) point to the closing position or any position in between in response to a signal from the user, as will be described in more detail below. Instead of a pivot point, the flow regulating valve 210 may be in the form of other configurations, such as a shutter or sliding door.

A valve 220 may be positioned at or near the intakes of each of the channels 204A, 204B. The valve 220 include a door that is connected at a pivot point 222 at or near one edge, so that it is positioned and configured to increase or decrease intake size of one or more of the channels 204A, 204B when moved, thus serving to influence the direction of the air flow so that more of the available air flows in a direction toward one channel or the other. For example, when the valve 220 is at a midway point, the air flow is divided substantially equal to both channels 204A and 204B. When the valve 220 is rotated in a first direction 224 past the midway point toward second channel 204B, the size of an intake leading to the first channel 204A is increased and the size of the intake leading to the second channel 204B is decreased. Likewise, rotating the valve 220 in a second direction 226 past the midway point toward the first channel 204A decreases the size of the intake leading to the first channel 204A and increases the size of the intake leading to the second channel 204B. The first and second directions 224, 226 are opposite directions. The proximal pivot point 222 of the valve 220 may be interconnected to a second actuator 520 that is configured to move the valve 220 from the midpoint in the first or second direction 224, 226 in response to a signal from the user, as will be described in more detail below. Instead of a pivot point 222, the valve may be configured as a sliding door or another structure that enables the system to selectively control the opening size of each channel 204A, 204B. Instead of a pivot point and connected member, the valve 220 may be in the form of other configurations, such as a shutter or sliding door.

The shape of each channel 204A, 204B may be formed by the interior divider 130 and the first and second curved walls 114, 124. Optionally, the surface area within each channel 204A, 204B may remain substantially constant from the channel's intake to the exit of the vent due to the decreasing width between the first curved wall 114 and the interior divider 130 that is attached to the housing and the increasing length between the second curved walls 124, 124. Optionally, the divider may be fixed 130 (i.e., non-rotating or otherwise moving). The channels are oppositely angled with respect to the air outlet 104 so that one channel directs air upward (or to the right) while the other channel directs air downward (or to the left) When the valve 220 increases the inlet to one of the channels 204A, more air flow is directed to that channel 204A and less air flow is directed to the other channel 204B (or other channels, if additional channels are available).

The first channel 204A may be positioned to direct air toward the air outlet 104 at a first angle $\theta_1$ with respect to an initial entry flow vector F of the air inlet 102, while the second channel 204B may be positioned to direct air toward the air outlet 104 at a second angle $\theta 2$ with respect to the flow vector F of the air inlet 102. The first angle $\theta_1$ and the second angle $\theta_2$ are adjacent and substantially equal angles. The first angle $\theta_1$ and the second angle $\theta_2$ may be approximately 45° to 75°. For example, the first angle $\theta_1$ and the second angle $\theta_2$ may each be approximately 60°, providing a wide zone of conditioned air possibilities.

For example, when the valve 220 is at the midway point, the air flow is divided substantially equal to both channels 204A and 204B, combining in the air outlet 104 to direct air in a flow vector substantially equal to the initial entry flow vector F. When the valve 220 is rotated in the first direction 224 past the midway point into the second channel 204B, more air flow is directed into the first channel 204A and exits the air outlet 104 in the direction of the first angle $\theta_1$ which may be in a first cross-car direction if the vent is vertically oriented (that is, if its longest dimension is vertical). Likewise, rotating the valve 220 in the second direction 226 past the midway point into the first channel 204A directs more air flow into the second channel 204B and exits the air outlet 104 in the direction of the second angle $\theta_2$ in a second cross-car direction if the vent is vertically oriented. For an air vent assembly 100 oriented in a vertical position, the valve 220 may control the air flow exiting the air outlet 104 to be directed cross-car left, straight, cross-car right or some combination therein. For an air vent assembly 100 oriented in a horizontal position, the valve 220 may control the air flow exiting the air outlet 104 to be directed upward, straight, downward or some combination therein.

Each channel 204A, 204B may include moveable vanes 230, each having a pivot point 232. For example, the pivot point 232 of two collinear vanes 230 in opposite channels 204A, 204B may be integral. When the integral pivot point 232 joining two opposite vanes 203 is rotated, both vanes 230 rotate in unison. Optionally, as shown in FIGS. 1-5, the movable vanes 230 include a first group of vanes in the first channel 204A and a second group of vanes in the second channel 204B. The moveable vanes 230 of each channel may be interconnected to a third actuator 530 that is configured to move each of the moveable vanes 230 of the vents in unison, as will be described in more detail below.

For example, when the movable vanes 230 are at a midway point, the air flow is directed through the air outlet 104 substantially centered. When the movable vanes 230 are rotated in a first direction 234 past the midway point (see FIG. 3), the air flow is directed downward and exits the air outlet 104 in the direction of a third angle $\theta_3$ with respect to the initial entry flow vector F of the air inlet 102. When the movable vanes 230 are rotated in a second direction 236 past the midway point, the air flow is directed upward and exits the air outlet 104 in the direction of a fourth angle $\theta_4$ with respect to the initial entry flow vector F. The third angle $\theta_3$ and the fourth angle $\theta_4$ may be approximately 45° to 75°. For example, the third angle $\theta_3$ and the fourth angle $\theta_4$ may be 60° providing a wide zone of conditioned air possibilities. For an air vent assembly 100 oriented in a vertical position, the movable vanes 230 may control the air flow exiting the air outlet 104 to be directed upward, straight, downward or some combination therein. For an air vent assembly 100 oriented in a horizontal position, the movable vanes 230 may control the air flow exiting the air outlet 104 to be directed cross-car left, straight, cross-car right or some combination therein.

Near the elongated edges 104A of the air outlet 104, curved interior surfaces forming a nozzle may be provided (see FIG. 2). The nozzle at the air outlet 104 is opened to allow for some pressure recovery due to the Coandă effect. The Coandă effect is the phenomena in which a jet flow attaches itself to a nearby surface and remains attached even when the surface curves away from the initial jet direction. This pressure recovery may reduce and/or eliminate air borne noise caused by turbulent air exiting the air outlet 104.

FIG. 5 is a bottom view of the air vent assembly 100 of FIG. 1 with actuators 510, 520, 530. The first actuator 510, the second actuator 520, and the third actuator 530 may be operated by a common motor or may be operated by individual motors. For example, a first motor 512 may operate the first actuator 510 connected to the flow regulating valve 210, a second motor 522 may operate the second actuator 520 connected to the valve 220, and a third motor 532 may operate the third actuator 530 connected to the movable vanes 230.

The actuators 510, 520, 530 may be controlled for example by a user input on an electronic screen have capacitive 'touch screen' capabilities. The air vent assembly 100 does not include manual controls in the air outlet 104 that interfere with the air flow and thus may have a slim profile compared to an air vent outlet having manual controls. The slim outlets can optionally have manual controls (not shown). User preferences may be preset at the air flow controls for different occupants wherein a user may set an air conditioning preference of air flow directions for each individual vehicle occupant. For example, a first driver may desire all instrument panel air vents to direct air flow toward his or her center of mass while a second driver may desire having all air vents direct air flow centered toward the general passenger compartment.

Figure 6:
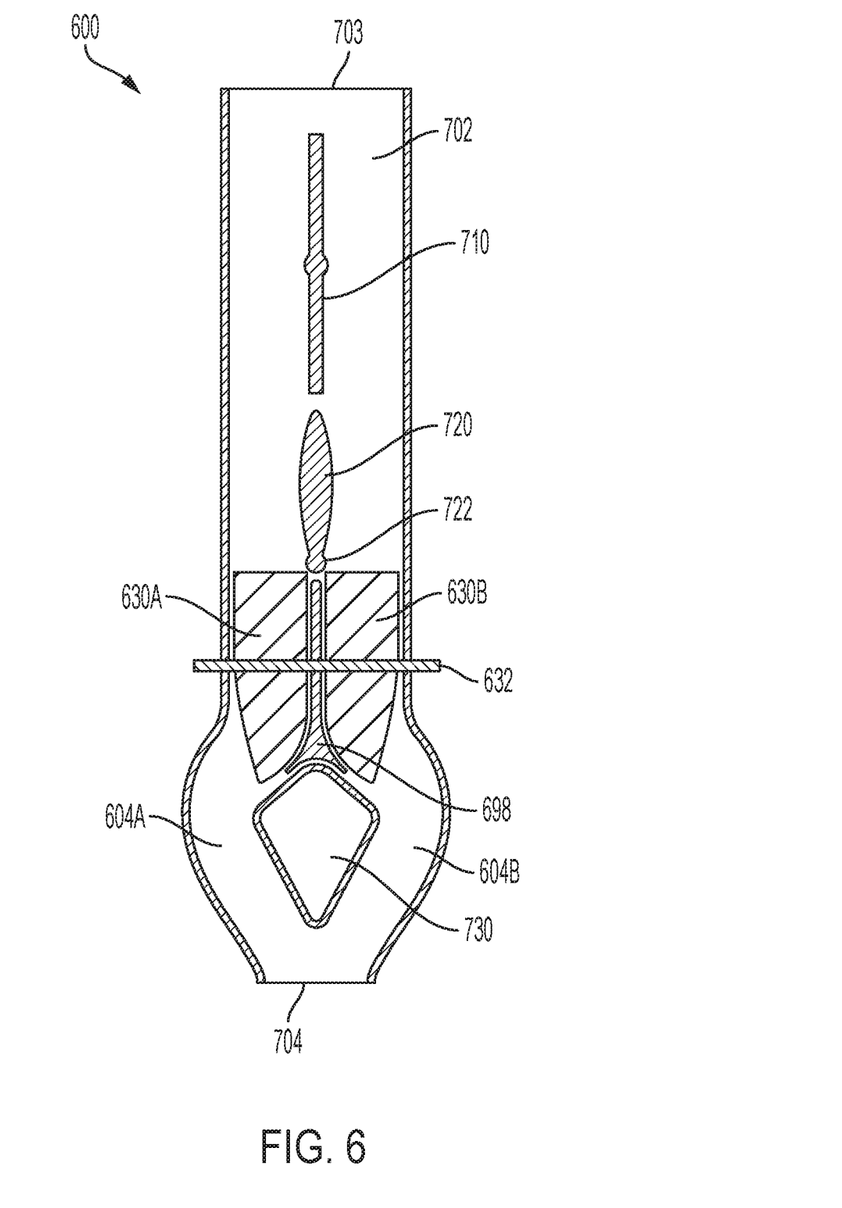
FIG. 6 is a side sectional view of an embodiment of the air vent assembly in which the vanes are positioned in a different location than that shown in FIG. 1 and are not viewable from the air outlet.

FIG. 6 illustrates an alternate embodiment of an air vent assembly 600 in which the vanes 630A, 630B are at least partially positioned upstream of the channels 604A, 604B. The vanes include two vane sets 630A, 630B. The two vane sets 630A, 630B may be subsets of an overall group of vanes, or the vane sets 630A, 630B may are physically separated by an optional space, a barrier (such as a wall or strip) or other divider 698 that serves as a structure that associates each vane set with one of the channels. (As shown, vanes 630A lead to channel 604a, and vanes 630B lead to channel 604B.) The channels are separated by a divider 730, which may be a space, a wall, a panel, or another structure that physically separates the two channels 604A, 604B. In this embodiment, the section of the housing that includes the channels 604A, 604B may have a narrower profile than that of the embodiment of FIGS. 1-5, and the vanes 630A, 630B may be set back far enough from the air outlet 704 so that they are not visible from outside of the outlet 704. This may occur because, for example as shown, the vanes 630A, 630B are positioned far enough back into the channels 604A, 604B. and behind and/or separated by one or more (optionally fixed) dividers (barrier 698 and/or space 730), so that at least one divider 698 and/or 730 blocks the viewability of the vanes 630 when one looks into the air outlet 704. Optionally, the divider(s) (barrier 698 and/or space 730), may be substantially as wide as, or at least as wide as, the air outlet 704. The channels 604A and 604B may be angled or curved around the divider(s) (barrier 698 and/or space 730) to further shield the vanes from being viewed via the air inlet. This may cause the housing of the assembly to be wider around the divider than it is at the air outlet. When this document uses the term "not visible", it means not visible with an unaided human eye (i.e., no camera with zoom, and no light specifically directed into the air inlet) that is positioned a typical viewing distance (i.e., one foot or more) away from the air inlet.

Operation of this embodiment is effectively the same as that of the embodiment of FIGS. 1-5. The valve 720 is positioned upstream of the vanes 630A, 630B, with a pivot point 722 positioned sufficiently proximate to the vanes 630A, 630B to enable the valve to rotate and regulate the air flow from the conduit 702 so that relatively more air will flow toward one or the other of the sets of vanes (630A or 630B). A flow regulating valve 710 may be positioned in the conduit 702 between the air intake 703 and the valve 720.

Figure 7A:
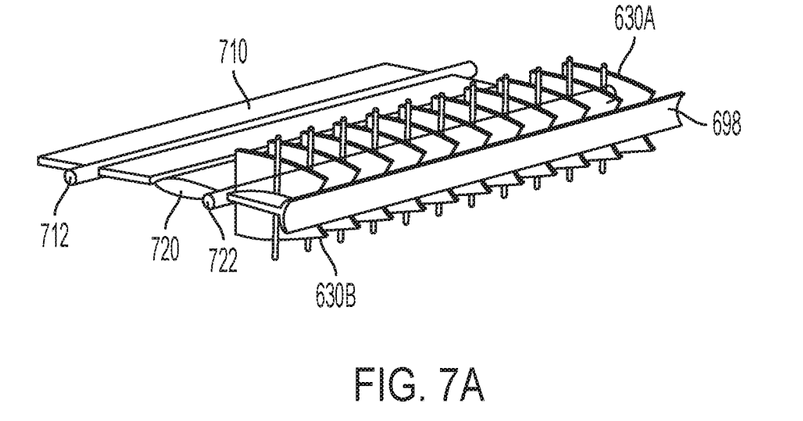
FIGS. 7A and 7B illustrate example embodiments of vane and divider structures that may be inside of an air vent assembly
Figure 7B:
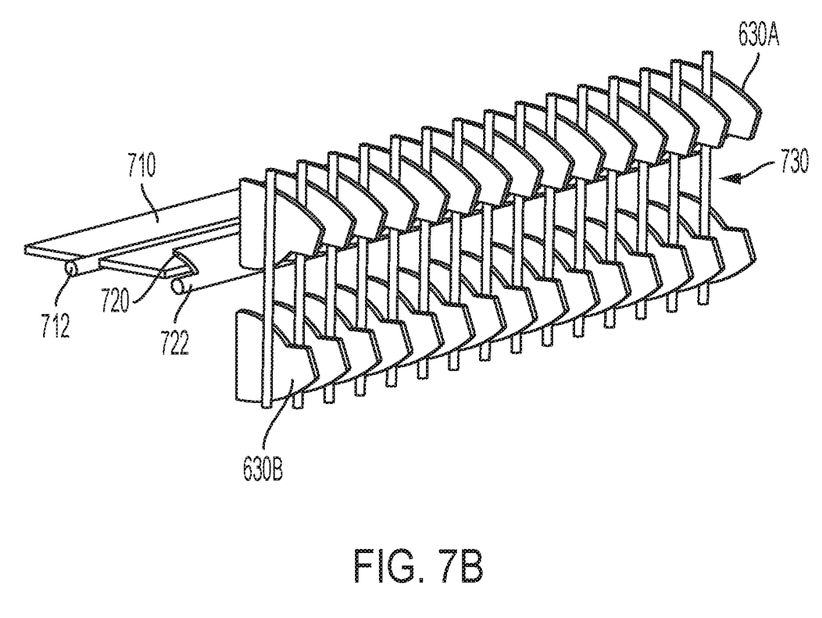

FIGS. 7A and 7B illustrates example configurations of vanes and dividers that may be used in the embodiment of FIG. 6. In FIG. 7A, the vanes include upper vane portions 630A and lower vane portions 630B divided by a centrally located divider 698, which in this case is a barrier wall. The barrier wall is curved so that each of the two opposing edges of the wall flares toward a corresponding channel of the air vent assembly. The divider 698 will be substantially as wide as, as wide as, or wider than the air outlet of the air vent assembly so that it blocks the vanes 630A, 630B from view when the air vent assembly is viewed straight on. In FIG. 7B, the vanes include upper vane portions 630A and lower vane portions 630B, which are physically separated by a dividing space 730. The dividing space 730 will be substantially as wide as, as wide as, or wider than the air outlet of the air vent assembly so that it blocks the vanes 630A, 630B from view when the air vent assembly is viewed straight on.

Figure 8:
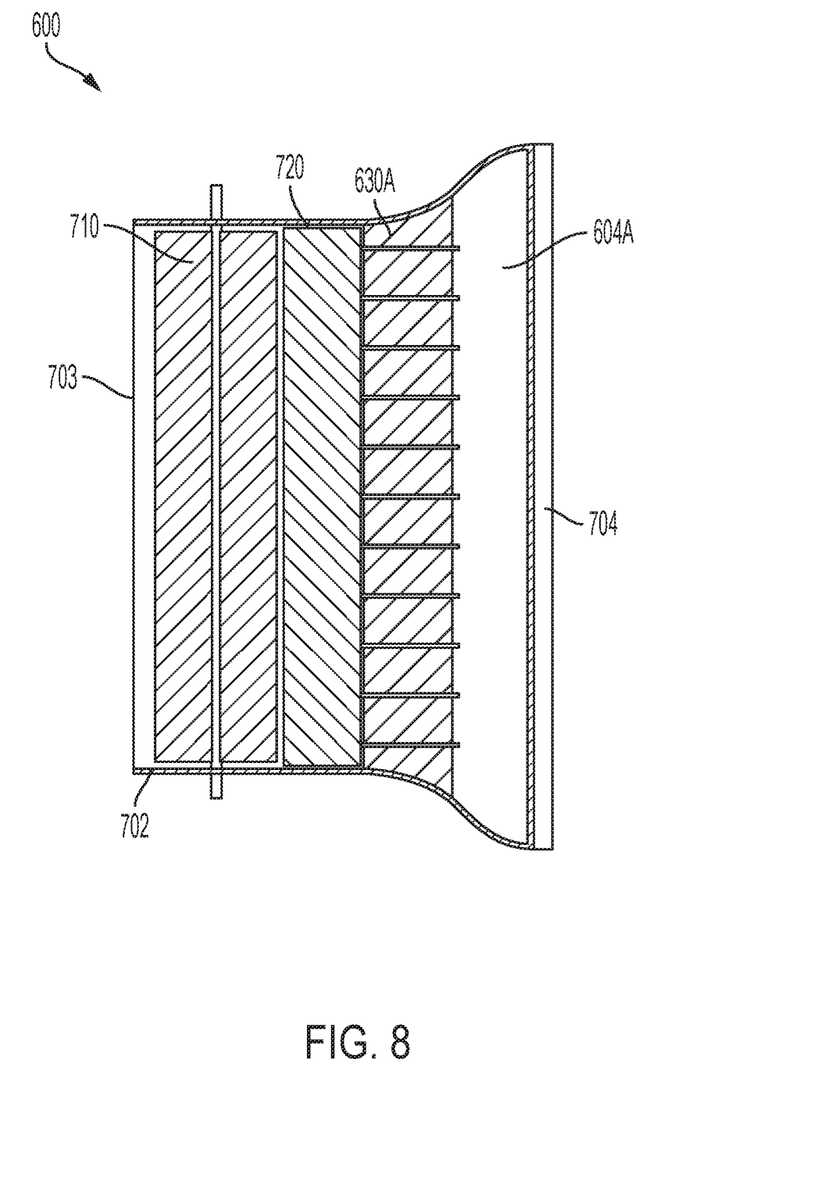
FIG. 8 is a top sectional view of the embodiment of FIG. 6.

FIG. 8 illustrates a top sectional view of the air vent assembly 600 of FIG. 6. Compared to the embodiment of FIG. 3, in FIG. 8 the top vanes 630A are further back within the top channel 604A and are not visible from the air outlet 704 because visibility is blocked by the divider (730, which is not visible in FIG. 9 because it is under top channel 604A).

Figure 9:
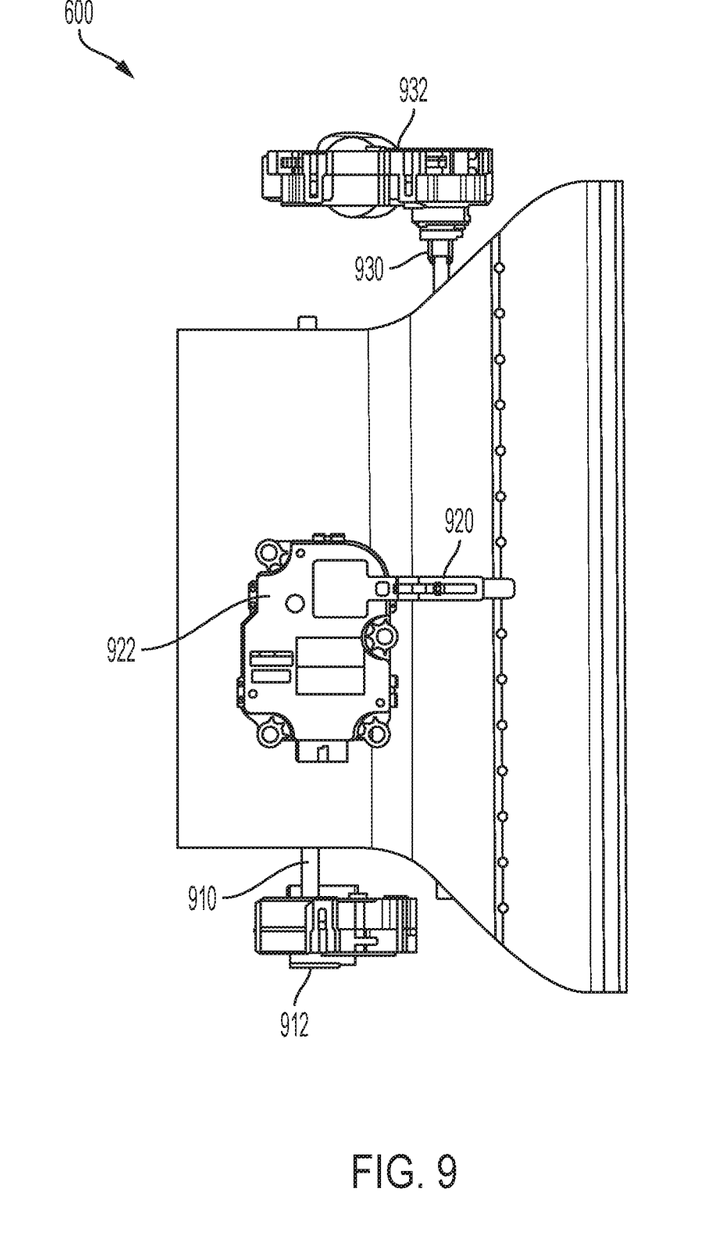
FIG. 9 is a view of the outside of the air vent assembly of FIG. 6 with actuators and motors.

FIG. 9 illustrates that in the embodiment of FIG. 6, a first motor 912 may be operably connected to an actuator 910 for the flow regulating valve (910 in FIG. 6). A second motor 922 may be operably connected to an actuator 920 for the directional valve (720 in FIG. 6). A third motor 932 may be operably connected to an actuator 930 for the moveable vanes (630 in FIG. 6).

The slim profile of the air vent assemblies described in this document enable them to be placed in a wide variety of vehicle locations, while leaving room for other components such as in-dash displays. The slim air vent design would provide the flexibility to be installed at various locations within the vehicle cabin.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

When used in this document, terms such as "top" and "bottom," "upper" and "lower", "upward" and "downward", "cross-car left" and "cross-car right", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. As another example, this embodiment may refer to a "top" view or an "upper" component, but those views and components may actually be on a side of a device if the device is turned so that what was referred to as the top is then oriented toward a side. The relative orientations of the components may be reversed, or the components may be on the same plane, if the orientation of the structure that contains the components is changed. The claims are intended to include all orientations of a device containing such components.

In this document, when terms such "first" and "second" are used to modify a noun, such use is simply intended to distinguish one item from another, and is not intended to require a sequential order unless specifically stated. The terms "approximately" and "about" when used in connection with a numeric value, is intended to include values that are close to, but not exactly, the number. For example, in some embodiments, the term "approximately" may include values that are within +/−10 percent of the value.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. An air vent assembly comprising:
   an air inlet;
   an air outlet;
   a plurality of channels positioned between the air inlet and the air outlet;
   a plurality of moveable vanes that are interconnected to an actuator that is configured to move the moveable vanes in unison, wherein the plurality of moveable vanes comprise a first set of moveable vanes and a second set of moveable vanes;
   a divider that is positioned to physically separate the first set of moveable vanes and the second set of moveable vanes;
   a first valve that is positioned between the air inlet and the moveable vanes, wherein the valve is configured to selectively increase or decrease air flow to at least one of the channels when moved, wherein the first valve is further configured to be rotated about a pivot point that is positioned between a first channel of the plurality of channels and a second channel of the plurality of channels so that:
      rotating the first valve in a first direction will decrease size of an intake area leading to the first channel,
      fully rotating the first valve in the first direction to a first closed position will close the first channel,
      rotating the first valve in a second direction will decrease size of an intake area leading to the second channel,
      fully rotating the first valve in the second direction to a second closed position will close the second channel, and
      the first and second directions comprise opposite directions; and
   a second valve that is:
      positioned upstream of the first valve within a conduit leading from the air inlet to the moveable vanes, and configured to regulate a volume of air to a downstream area of the conduit.

2. The air vent assembly of claim 1, a wherein the second valve is configured to be rotated from a fully-open position to a closing position in which air flow to the channels is blocked.

3. The air vent assembly of claim 1, wherein the divider is positioned to block and prevent the moveable vanes from being visible via the air outlet.

4. The air vent assembly of claim 3, wherein the divider comprises a fixed barrier that is positioned in front of at least a portion of the moveable vanes.

5. The air vent assembly of claim 3, wherein the divider also physically separates a first of the plurality of channels and a second of the plurality of channels.

6. The air vent assembly of claim 3, wherein the channels are angled or curved to flare around the divider so that the air vent assembly is wider at a position of the divider than it is at the air outlet.

7. The air vent assembly of claim 1, wherein the actuator is interconnected to the moveable vanes so that the actuator is configured to move each of the moveable vanes in unison.

8. The air vent assembly of claim 1, wherein:
the first set of vanes is positioned in a first channel of the plurality of channels; and
the second set of vanes is positioned in a second channel of the plurality of channels.

9. The air vent assembly of claim 1, wherein:
the first set of vanes is at least partially positioned in a conduit that leads from the air inlet and that lead to a first channel of the plurality of channels; and
the second set of vanes is at least partially positioned in the conduit and that lead to a second channel of the plurality of channels.

10. The air vent assembly of claim 1, wherein the moveable vanes are positioned upstream of each of the channels.

11. The air vent assembly of claim 1, further comprising:
a first motor for operating the actuator; and
a second motor for operating the first valve.

12. The air vent assembly of claim 1, wherein:
a first channel of the plurality of channels is positioned to direct air toward the air outlet at a first angle with respect to a flow vector of the air inlet;
a second channel of the plurality of channels is positioned to direct air toward the air outlet at a second angle with respect to the flow vector of the air inlet; and
the first angle and the second angle are adjacent and substantially equal angles.

13. An air vent assembly comprising:
an air inlet;
an air outlet;
a plurality of channels positioned between the air inlet and the air outlet;
a plurality of moveable vanes that are interconnected to an actuator that is configured to move each of the moveable vanes in unison, wherein the plurality of moveable vanes comprise a first set of moveable vanes and a second set of moveable vanes;
a first valve that is positioned between the air inlet and the moveable vanes, wherein the valve is configured to selectively increase or decrease air flow to at least one of the channels when moved;
a second valve that is positioned upstream of the first valve within a conduit leading from the air inlet to the moveable vanes, wherein the second valve is configured to regulate a volume of air leading from the air intake to the first valve;
a first motor for operating the actuator;
a second motor for operating the first valve; and
a divider that is positioned to:
physically separate the first set of moveable vanes and the second set of moveable vanes, and
block and prevent the moveable vanes from being visible via the air outlet.

14. The air vent assembly of claim 13, wherein the moveable vanes comprise:
a first group of vanes that are positioned in a first channel of the plurality of channels; and
a second group of vanes positioned in a second channel of the plurality of channels.

15. The air vent assembly of claim 13, wherein the moveable vanes comprise:
a first group of vanes that are at least partially positioned in a conduit that leads from the air inlet and that lead to a first channel of the plurality of channels; and
a second group of vanes that are at least partially positioned in the conduit and that lead to a second channel of the plurality of channels.

16. The air vent assembly of claim 13, wherein the divider comprises a fixed barrier that is positioned in front of at least a portion of the moveable vanes.

17. The air vent assembly of claim 13, wherein the first valve is further configured to be rotated about a pivot point that is positioned between a first channel of the plurality of channels and a second channel of the plurality of channels so that:
rotating the first valve in a first direction will decrease size of an intake area leading to the first channel;
fully rotating the first valve in the first direction to a first closed position will close the first channel;
rotating the first valve in a second direction will decrease size of an intake area leading to the second channel;
fully rotating the first valve in the second direction to a second closed position will close the second channel; and
the first and second directions comprise opposite directions.

18. The air vent assembly of claim 13, wherein the second valve is configured to be rotated from a fully-open position to a closing position in which air flow to the channels is blocked.

* * * * *